United States Patent [19]

York

[11] Patent Number: 4,932,814
[45] Date of Patent: Jun. 12, 1990

[54] PORTABLE LINE BORING MACHINE

[76] Inventor: Ronald A. York, 1971 Island Highway, Campbell River, B.C., Canada, V9W 2G3

[21] Appl. No.: 384,271

[22] Filed: Jul. 24, 1989

[51] Int. Cl.⁵ .............................................. B23B 45/14
[52] U.S. Cl. .................................. 408/1 R; 29/26 B; 408/111; 408/138; 408/705
[58] Field of Search ............... 408/1 R, 236, 102, 110, 408/111, 124, 125, 135, 138, 705, 708; 409/231, 232, 233, 234; 29/26 B

[56] References Cited

U.S. PATENT DOCUMENTS

| 920,011 | 4/1909 | Boggs. | |
|---|---|---|---|
| 1,767,384 | 6/1930 | Litter | 408/1 R |
| 2,683,375 | 7/1954 | Gerentes | 408/705 X |
| 2,810,141 | 10/1957 | Langston | 408/124 X |
| 3,075,415 | 1/1963 | Dabringhaus | 408/705 X |
| 3,512,433 | 5/1970 | Juhasz et al. | |
| 3,583,822 | 6/1971 | Alexander et al. | 408/137 X |
| 4,197,041 | 4/1980 | Prewitt | 408/111 X |
| 4,571,795 | 2/1986 | Shiets | 408/111 X |
| 4,582,105 | 4/1986 | Wolff | 144/106 |
| 4,701,081 | 10/1987 | Hashimoto et al. | 408/1 R |

*Primary Examiner*—Z. R. Bilinsky
*Attorney, Agent, or Firm*—Poms, Smith, Lande & Rose

[57] ABSTRACT

A portable line boring machine has a rotatable boring bar on which a tool bit is mountable. A first drive mechanism rotatably drives one end of the boring bar. A second drive mechanism linearly drives the first drive means and the boring bar along the longitudinal axis of the boring bar. A frame supports the first drive means, the second drive means and the boring bar.

10 Claims, 1 Drawing Sheet

PORTABLE LINE BORING MACHINE

FIELD OF THE INVENTION

This invention pertains to line boring machines which are easily portable for assembly and operation by a single workman.

BACKGROUND OF THE INVENTION

Line boring machines are used to bore cylindrical apertures in metal work pieces. There are many applications for such machines including, for example, boring apertures for mounting bearings in marine propulsion systems or in excavating machines.

Prior art line boring machines are typically large, expensive structures which are difficult to transport and cumbersome to operate in many working environments. These problems could be avoided if it were possible to bring the work piece to the line boring machine and operate the machine in a properly equipped workshop. However, the work piece is normally part of a relatively massive piece of equipment which is more difficult to transport than the line boring machine. Moreover, it is normally necessary to complete the line boring operation quickly in order to minimize down time of the equipment which undergoes the line boring operation. Accordingly, it is usually necessary to cope with the problems of transporting the line boring machine to the work piece and operating it in under less than ideal conditions.

The present invention overcomes the limitations of prior art line boring machines by providing a portable line boring machine which one man can easily transport, assemble and operate in virtually any working environment.

SUMMARY OF THE INVENTION

In accordance with the preferred embodiment, the invention provides a portable line boring machine, comprising a rotatable boring bar, a tool bit which is mountable on the boring bar, first drive means for rotatably driving one end of the boring bar, second drive means for linearly driving the first drive means and the boring bar along the longitudinal axis of the boring bar, and a frame for supporting the first drive means, the second drive means and the boring bar.

Advantageously, the frame comprises first and second parallel guide members which extend between opposed first and second ends of the frame. The first drive means is slidable with respect to the guide members. A first support means is fixed at the first frame end, for supporting the boring bar. A second support means is slidably mounted on the guide members, between the first and second frame ends, for supporting the first drive means. A third support means is fixed at the second frame end, for supporting the second drive means. A screw feed means is coupled between the first, second and third support means, and is rotatably driven by the second drive means.

Mounting means are provided for rigid affixation to a work piece and for rotatably and slidably supporting the boring bar. The mounting means may comprise at least one bearing collar. Preferably, the mounting means comprises first and second bearing collars.

Preferably, the first drive means comprises a reversible, variable speed drive motor; and, the second drive means comprises a reversible, variable speed drive motor.

DETAILED DESCRIPTION OF THE PREFERRED EMBODIMENT

Figure 1:
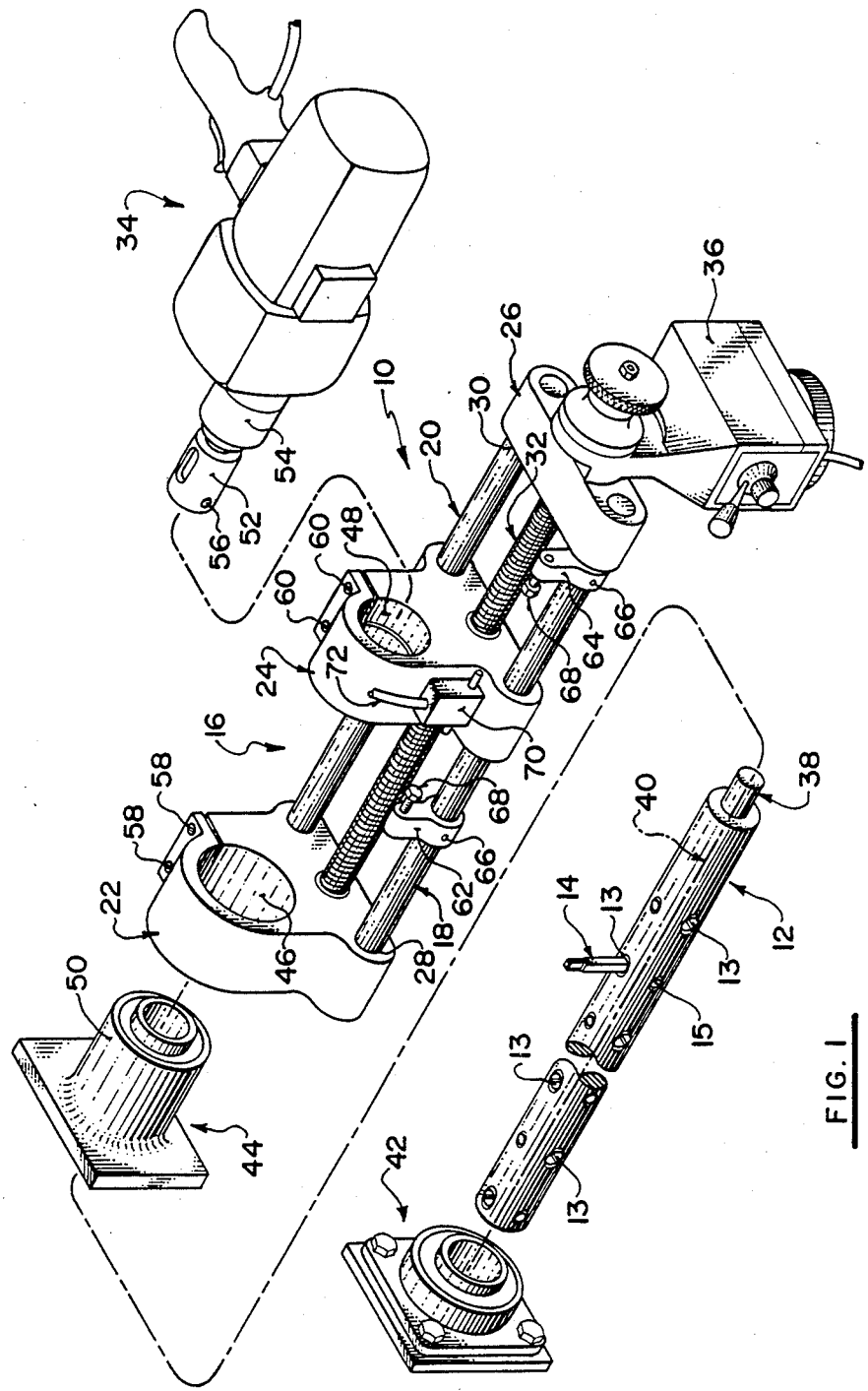
FIG. 1 is an exploded pictorial illustration of a portable line boring machine constructed in accordance with the preferred embodiment of the invention.

The drawings illustrate a portable line boring machine 10 having a conventional rotatable boring bar 12 with a plurality of apertures 13 in any one of which a conventional tool bit 14 may be mounted in conventional fashion and locked in place by tightening the corresponding screw 15. Machine 10 incorporates a frame 16 consisting of first and second parallel guide members 18, 20; and, first, second and third "support means" 22, 24 and 26. Guide members 18, 20 extend between first and second ends 28, 30 of frame 16. First support means 22 is fixed to guide members 18, 20 at frame first end 28. Third support means 26 is fixed to guide members 18, 20 at frame second end 30. The opposed ends of a "screw feed means", namely threaded rod 32, are journalled for rotation within first and third support means 22, 26 respectively. The central portion of rod 32 is threadably coupled to second support means 24 such that rotation of rod 32 slidably, linearly advances second support means 24 along guide members 18, 20 toward either of frame ends 28, 30, as hereinafter explained.

Second support means 24 supports a "first drive means", namely reversible, variable speed electric drive motor 34; Drive motor 34, which is preferably a "FEIN" model DDSK 672-1 portable drill, manufactured by C & E Fein GmbH & Co. of Stuttgart, West Germany, rotatably drives one end 38 of boring bar 12 about the longitudinal axis 40 of boring bar 12, as hereinafter explained. Third support means 26 supports drive motor 36, which rotatably drives threaded rod 32, which in turn linearly drives motor 34 and boring bar 12 along the longitudinal axis 40 of boring bar 12, as hereinafter explained. Drive motor 36 is preferably a model 3750-140 servo power feed unit, manufactured by Servo Products Company of Pasadena, California.

"Mounting means" such as bearing collars 42, 44 are provided to further rotatably support boring bar 12 and align it with the portion of the work piece (not shown) in which tool bit 14 is to bore a cylindrical aperture. More particularly, boring bar 12 is first slidably advanced through the work piece aperture. Bearing collars 42, 44 are then slid over the opposite ends of boring bar 12 and advanced to opposite sides of the work piece. Boring bar 12 is then manipulated to align it properly within the work piece aperture. Once boring bar 12 is properly aligned, the outer flanges of bearing collars 42, 44 are temporarily welded to the work piece, leaving the bearings within collars 42, 44 free to rotate. Bearing collars 42, 44 are thus rigidly affixed to the work piece to rotatably and slidably support boring bar 12 for rotation within and sliding advancement along the work piece aperture.

Frame 16 (to which motor 36 normally remains attached) is then slidably advanced over boring bar end 38 by passing boring bar end 38 through cylindrical apertures 46, 48 in first and second mounting means 22, 24 respectively, until the extended collar 50 of bearing collar 44 protrudes snugly within aperture 46. If boring bar end 38 protrudes into o through aperture 48 then drive motor 36 is actuated, in reverse, to rotate threaded rod 32 and draw second mounting means 24 away from first mounting means 22 (i.e. toward second frame end 30) to leave boring bar end 38 between first and second mounting means 22, 24. Drive motor 34, which has a "pistol" configuration, is then positioned on frame 16 by passing drive socket 52 through aperture 48 and over boring bar end 38 until drive motor collar 54 rests snugly within aperture 48. Set screw 56 on socket 52 is tightened to clamp socket 52 firmly to boring bar end 38. Screws or bolts 58 provided on first mounting means 22 are tightened to clamp first mounting means 22 firmly around collar 50. Similarly, screws 60 provided on second mounting means 24 are tightened to clamp second mounting means 24 firmly around collar 54. Tool bit 14 is then mounted on boring bar 12 and adjusted in conventional fashion.

Stops 62, 64 are slidably mounted on guide member 18 to limit the travel of support member 24 in either direction as motor 36 slidably advances member 24 forward or backwards along guide members 18, 20. Screws 66 are tightened to fasten stops 62, 64 respectively in place at selected locations on guide member lB near first and second ends 2B, 30 of frame 16. Bolts 68 project inwardly from the upper ends of stops 62, 64 to contact the protruding switch element of double-sided limit switch 70 when support member 24 reaches the extremity of its travel defined by the location of stops 62, 64. Upon such contact, a signal transmitted by limit switch 70 along cable 72 stops motor 36, preventing further longitudinal advancement or retraction of support member 24.

In operation, drive motor 34 is actuated to rotatably drive boring bar 12 about its longitudinal axis 40 in a first direction and at a selected speed of rotation, thereby rotating tool bit 14. Motor 36 is then actuated to rotate threaded rod 32 at a selected speed, in a direction which linearly advances second mounting means 24 and, with it, motor 34 and boring bar 12, along rod 32 and guide members 18, 20 (i.e. along axis 40) toward frame first end 28. This action in turn advances rotating tool bit 14 into the work piece aperture to perform the boring operation. The operator monitors the boring operation and adjusts the operating speed of either or both of motors 34, 36 as required. When the boring operation is complete, motor 36 is reversed to rotate rod 32 in the opposite direction, linearly withdrawing tool bit 14 from the work piece aperture.

Machine 10 is disassembled by removing tool bit 14 from boring bar 12; loosening screws 56, 58 and 60; removing motor 34 from frame 16; removing frame 16 and motor 36 from boring bar 12; withdrawing boring bar 12 from the work piece; breaking the temporary welds which affix bearing collars 42, 44 to the work piece; and then removing bearing collars 42, 44 from the work piece. One man can easily handle the various parts comprising machine 10, quickly assemble them as aforesaid, operate machine 10, and quickly disassemble it.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A method of boring an existing cylindrical aperture in a work piece to enlarge the diameter of said aperture, said method comprising the steps of:
   (a) inserting a boring bar through said aperture;
   (b) sliding a first bearing over a first end of said boring bar to rotatably support said first end;
   (c) sliding a second bearing over the opposite end of said boring bar to rotatably support said second end;
   (d) axially aligning said boring bar with said aperture;
   (e) fixing said first and second bearings to said work piece;
   (f) mounting a tool bit on said boring bar between said first bearing and said work piece;
   (g) sliding, over said first bearing, a frame supporting:
      (i) a first drive means for rotatably driving said boring bar first end to rotate said boring bar about the longitudinal axis of said boring bar; and,
      (ii) a second drive means for linearly driving said first drive means and said boring bar along said axis; and,
   (h) operating said first and second drive means to rotate said boring bar about said axis while driving said first drive means and said boring bar along said axis.

2. A portable line boring machine for boring an existing cylindrical aperture in a work piece to enlarge the diameter of said aperture, said machine comprising:
   (a) a rotatable boring bar;
   (b) a tool bit mountable on said boring bar;
   (c) first drive means for rotatably driving one end of said boring bar;
   (d) second drive means for linearly driving said first drive means and said boring bar along the longitudinal axis of said boring bar;
   (e) a frame for supporting said first drive means, said second drive means and said boring bar; and,
   (f) mounting means, free of connecting to said frame, for rigid initial affixation of said mounting means to said work piece independently of said frame, and for subsequently slidably supporting said frame.

3. A portable line boring machine as defined in claim 2, wherein:
   (a) said frame comprises first and second parallel guide members extending between opposed first and second ends of said frame; and,
   (b) said first drive means is slidable with respect to said guide members.

4. A portable line boring machine as defined in claim 3, wherein said frame further comprises:
   (a) first support means fixed at said first frame end, for supporting said boring bar; and,
   (b) second support means slidably mounted on said guide members, between said first and second frame ends, for supporting said first drive means.

5. A portable line boring machine as defined in claim 4, wherein said frame further comprises third support means fixed at said second frame end, for supporting said second drive means.

6. A portable line boring machine as defined in claim 5, further comprising screw feed means coupled between said first, second and third support means, and rotatably drivable by said second drive means to linearly advance said second support means along said guide members.

7. A portable line boring machine as defined in claim 6, wherein said mounting means comprises at least one bearing collar.

8. A portable line boring machine as defined in claim 6, wherein said mounting means comprises first and second bearing collars.

9. A portable line boring machine as defined in claim 6, wherein said first drive means comprises a reversible, variable speed drive motor.

10. A portable line boring machine as defined in claim 6, wherein said second drive means comprises a reversible, variable speed drive motor.

* * * * *